(12) United States Patent
Wei

(10) Patent No.: US 7,785,452 B2
(45) Date of Patent: Aug. 31, 2010

(54) APPARATUS AND METHOD FOR FINISHING LIGHT METAL ARTICLE

(75) Inventor: Daniel C. Wei, Ann Arbor, MI (US)

(73) Assignee: Super Alloy Industrial Co., Ltd., Yunlin County (TW)

( * ) Notice: Subject to any disclaimer, the term of this patent is extended or adjusted under 35 U.S.C. 154(b) by 1175 days.

(21) Appl. No.: 11/376,916

(22) Filed: Mar. 16, 2006

(65) Prior Publication Data

US 2007/0215487 A1    Sep. 20, 2007

(51) Int. Cl.
C25F 7/00 (2006.01)
C25F 3/20 (2006.01)

(52) U.S. Cl. .................. 204/280; 204/288; 205/652

(58) Field of Classification Search ........... 205/652; 204/280, 288
See application file for complete search history.

(56) References Cited

U.S. PATENT DOCUMENTS

| 4,752,367 A | 6/1988 | Vishnitsky ............... 204/129.5 |
| 5,647,426 A | 7/1997 | Prieto et al. ................. 164/348 |
| 6,346,159 B1 | 2/2002 | Chase et al. .................. 156/79 |
| 6,579,439 B1 * | 6/2003 | Chandler .................... 205/671 |
| 2006/0131184 A1 * | 6/2006 | Mielke ....................... 205/651 |

* cited by examiner

Primary Examiner—Alexa D. Neckel
Assistant Examiner—Nicholas A. Smith
(74) Attorney, Agent, or Firm—Banger Shia

(57) ABSTRACT

An apparatus and method for finishing an electrically conductive part through electrochemistry is disclosed. The cathode electrode is configured so as to fit simultaneously in one or more windows or pockets or in a combination thereof. In one embodiment of the present invention a disc-covering cathode electrode is provided that can simultaneously finish all of the windows and pockets using an electrolyte.

10 Claims, 5 Drawing Sheets

APPARATUS AND METHOD FOR FINISHING LIGHT METAL ARTICLE

TECHNICAL FIELD

The present invention relates generally to metal material removal and polishing. More particularly, the present invention relates to a method and apparatus for electrochemically finishing the surface of an electrically conductive part by deburring and polishing one or more surfaces of the part.

BACKGROUND OF THE INVENTION

Automobile and truck wheels include an annular wheel rim capable of receiving and securely holding a pneumatic tire. A wheel disc having a circular configuration is formed within the annular wheel rim. The wheel disc may be solid or may have one or more apertures formed therethrough for aesthetics and to reduce weight. The wheel disc will also of necessity have a plurality of wheel attachment holes formed threrethrough for attachment to the vehicle wheel hub studs.

As is known, vehicle wheels were for many years produced from steel. Such wheels were produced by stamping of the wheel disc and attaching it to a formed rim. However, as technology improved non-ferrous wheels became valuable alternative to the stamped-steel wheels previously known. The fabricating process (forging or casting) allowed the manufacturer to make the wheel wherein the wheel disc has a variety of patterns and configurations. Early wheels were made from steel by casting or forming. While providing improvements over the stamped and formed steel wheel, the wheels made from steel were restricted to the styling design. Eventually because of advancements in fabricating techniques, additional castable or forgeable metal materials were used, including such relatively light-weight materials as aluminum, magnesium, and titanium alloys.

Regardless of the material from which the light metal wheel is formed, the manufacturing process typically results in rough surface, corners, edges and burrs around both the wheel openings and the wheel pockets formed or machined on the face of the wheel. These imperfections must be removed for reasons both of aesthetics and safety. The finishing process which removes rough surface, corners, edges and metal burrs has typically been very time-consuming, involving as is known the use of a variety of grinding, polishing and finishing tools applied with various levels of manual operations and automation. While providing satisfactory results in general, the use of such manpower and equipment has been both time-consuming, quality inconsistent and cost-ineffective, thus being a possible but less-than-optimum solution for the production of wheels on any sort of volume basis. In addition, the use of deburring equipment on light metal wheels, particularly on aluminum alloy wheels, has also been proven to be undesirable because of the tendency for deburring to discolor the metal.

In an effort to overcome the inefficiencies of known methods at wheel finishing, electrochemical finishing of wheels made from a conductive metal have been put forward. The electrochemical process has been used in two ways in which one process relies on an electrochemical reaction between an anode and a cathode and the other process relies on a combination of electrochemistry and mechanical grinding/polishing.

According to the first known technique, the metal part (the anode) is operatively connected with the positive post of a rectifier. The finishing electrode (the cathode) is operatively connected with the negative post of the rectifier. (This arrangement is in opposite order from electroplating.) The finishing electrode is fitted to the metal part to be finished in a spaced-apart relationship. A narrow gap must be maintained between the finishing electrode and the metal part to prevent short-circuiting. An electrolyte is then flowed through the gap formed between the finishing electrode and the metal part. A current is applied such that the current flows from the surface of the anode to the through the electrolyte to the face of the cathode. This flow effects removal of the rough material resulting in a rounded edge and smooth surface.

According to a second known technique, a rotatable grinding wheel, such as an electrically conductive diamond-coated wheel, is provided for deburring. The grinding wheel is charged and acts as a cathode and the metallic, electrically-conductive surface to be ground functions as the anode. In operation, an electrolyte fluid is flowed between the grinding wheel and the sharp edge of the part being worked. Similar to the process mentioned above which relies only on electrochemistry, the mechanical-electrochemical process utilizes a rectifier to provide the desired charges to the anode and cathode.

While the known techniques have provided advancements in the art of finishing parts made from conductive metals, there yet exists opportunities to improve the state of the art. Accordingly, the present invention provides an alternative method of finishing a metallic wheel that is both efficient and cost-effective and provides a further advancement in the state of the art.

SUMMARY OF THE INVENTION

The present invention provides an efficient method and apparatus for finishing an electrically conductive part through electrochemistry. The present invention utilizes a cathode electrode that is configured so as to fit simultaneously in one or more windows or pockets or in a combination thereof. In an alternative embodiment of the present invention a disc-covering cathode electrode is provided that can simultaneously finish all of the windows and pockets using an electrolyte.

In the first embodiment an electrode having an external shape that substantially mirrors the interior walls of a window or pocket (the "B" face) is provided for fitting within one or more of the window or pocket. (It should be noted that some wheels have only windows, some wheels have only pockets, while others have a combination of pockets and windows.) In this embodiment the finishing or deburring activity may be limited by either insulating the part being finished (the anode), by adjusting the gap between the anode and the cathode, or both. The individual or plural electrodes are fitted to a fixture in a known manner.

In the second embodiment a disc-fitting electrode is provided having a part-facing surface that is configured so as to have window-mating and pocket-mating features formed thereon. As with the individual electrode arrangement set forth above, the finishing activity may be limited by either insulating the part being finished, by adjusting the gap, or both. According to this embodiment, both the B faces of the windows and of the pockets as well as the front surface of the wheel disc (the "A" face) can be finished simultaneously.

According to the present invention, rapid and consistent finishing of metal parts, particularly aluminum alloy vehicle wheels, may be achieved. The present invention also provides for improvements in control of the anode electrode (the part) with respect to the cathode electrode. Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
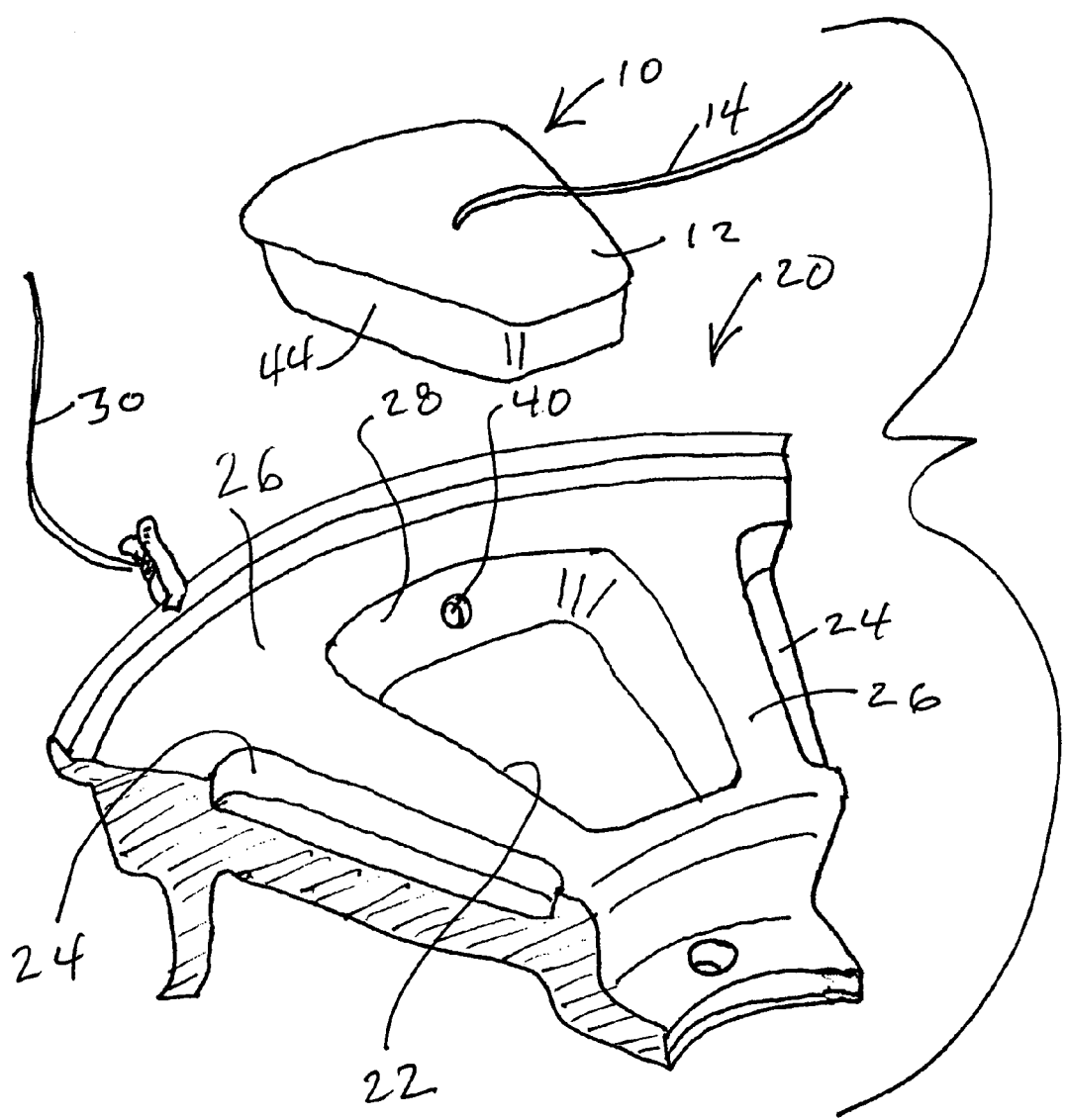
FIG. 1 shows a perspective view of a portion of a metal article in the form of a vehicle wheel with an electrode in spaced-apart relation thereto.

In the following figures, the same reference numerals will be used to refer to the same components. In the following description, various operating parameters and components are described for one constructed embodiment. These specific parameters and components are included as examples and are not meant to be limiting.

Referring now to FIG. 1, a perspective view of an electrode, generally illustrated as 10, is shown in spaced-apart relation to an electrically conductive metal article, in this case a vehicle wheel, shown in partial view and generally illustrated as 20. The electrode 10 may be produced from any number of known conductive materials, including brass or copper. The electrode 10 includes a body 12 and a power lead 14. The lead 14 is connected to a rectifier (not shown in FIG. 1, but shown in FIG. 3, discussed below).

The wheel 20 may be composed of any electrically conductive material as is know to those skilled in the art, but is typically formed or machined from aluminum alloy. The wheel 20 typically includes at least one window 22 (formed or machined through the wheel 20) and often includes at least one pocket or blind window 24. As illustrated, the pocket 24 is not formed or machined completely through the wheel 20.

The surface area formed or machined between the window 22 and the pocket 24 is typically substantially flat and is referred to as the "A" face in the industry. The "A" face in the wheel 20 is "A" face 26. The surface formed or machined on the walls of the window 22 is referred to as the "B" face in the industry. The "B" face in the wheel 20 is "B" face 28. A power lead 30 is connected at one end to the wheel 20.

Figure 2:
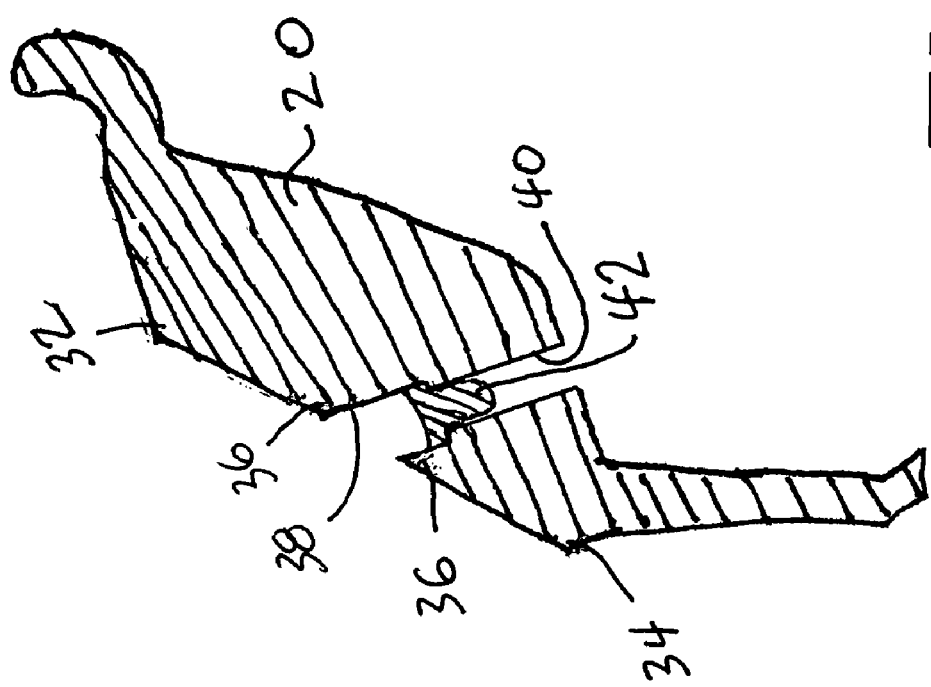
FIG. 2 shows a sectional view of a vehicle wheel before undergoing the finishing process of the present invention.
Figure 3:
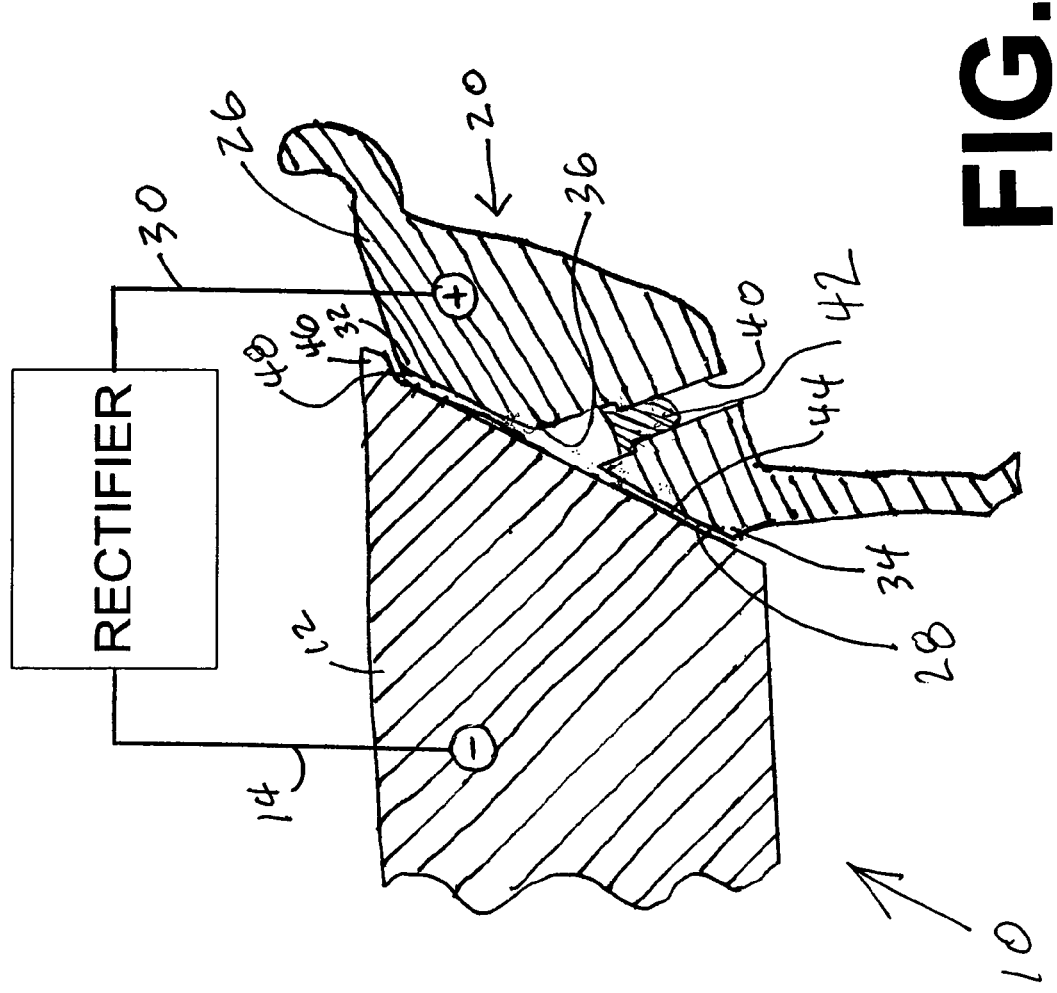
FIG. 3 shows a sectional view of the electrode and vehicle wheel of FIG. 1 with the electrode being positioned adjacent the vehicle wheel shown in sectional view in FIG. 2.
Figure 4:
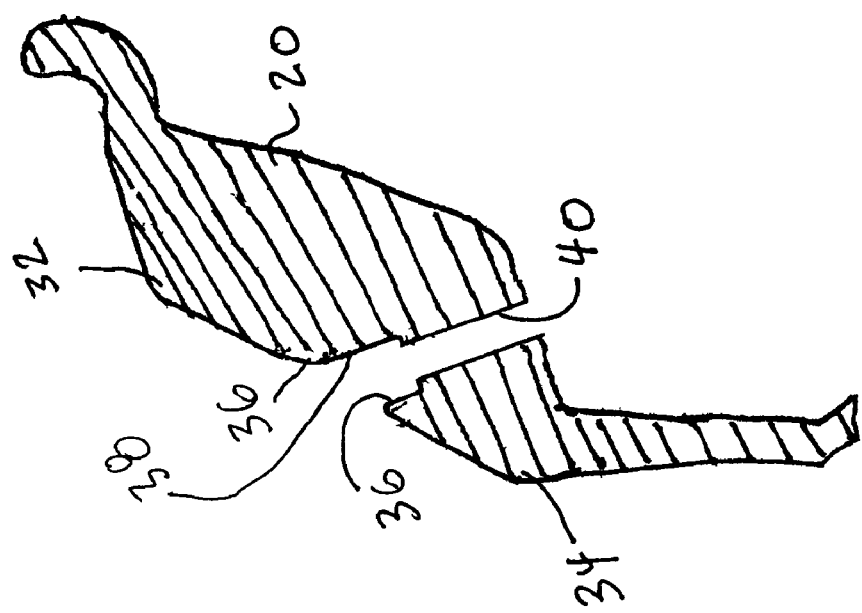
FIG. 4 shows a view of the vehicle wheel similar to that of FIG. 2 but illustrating the burrs having been removed.

FIGS. 2 through 4 illustrate the vehicle wheel 20 before, during and after undergoing the process of the present invention. With respect first to FIG. 2, the wheel 20 is shown in sectional view. As seen in this view, a number of edges exist that are remnants of the wheel formation process. Specifically, an edge 32 is formed or machined between the A face 26 and the B face 28. An edge 34 is also formed or machined between the B face 28 and the inner wall of the wheel 20. In addition, an edge 36 is formed or machined around a valve seat 38 which forms the opening for an air valve hole 40. The air valve hole 40 passes through the wheel 20.

The edges 32, 34 and 36 are relatively sharp and have burrs. While the object of the present invention is primarily one of polishing, deburring occurs as a by-product of the polishing operation.

Prior to treatment in accordance with the present invention, a valve hole plug 42 formed from a polymerized composition such as rubber is inserted into the valve seat 38 to restrict passage thereby of the electrolyte discussed below. After processing, the valve hole plug 42 is removed. As illustrated, the valve hole plug 42 has a concave upper surface, but it is to be understood that the upper surface could be flat as well or could take on any other configuration as is known in the art.

FIG. 3 illustrates the electrode 10 in position relative to the wheel 20. The B face 28 of the window 22 is adjacent to a surface 44 formed on a wall of the electrode body 12. As is clear from the illustration, a gap appears between the B face 28 of the window 22 and the surface 44 of the electrode 10. The gap may be adjusted to control the amount of finishing activity as is known in the art. Typically, however, a gap in the range of between 0.01" and 0.15" would be suitable.

An electrolyte flows in the gap created between the electrode 10 and the wheel 20. The electrolyte may be selected from the group consisting of sodium chloride, sodium nitride, sodium nitrate, or sodium sulfate as is known to those skilled in the art. The electrolyte may be applied through flowing processes, spraying, or by dipping the vehicle wheel 20 and the electrode 10 into an appropriate vat.

During the machining process the resulting edge may be sharper than desired. To deburr and to otherwise finish the edge 32, a lip 46 is formed extending from the body 12 of the electrode 10. The lip 46 is spaced apart from the edge 32 by a gap 48. The gap 48 may be in the range of between 0.01" and 0.15" according to the amount of material that is to be removed from the edge 32. The wider the gap 48, the less material will be removed from the edge 32. The width of the gap 48 may be selected depending upon the desired sharpness of the edge 32. While the electrode 10 is illustrated as having the lip 46, it is not necessary that the lip 46 be present for the successful operation of the method. The lip 46 may be desirable or even mandatory in those instances where the edge 32 must be well-curved with a large radius. Conversely, where the edge 32 need not have a large radius, the lip 46 is not needed.

While the present invention is directed to polishing, it is important to note that deburring is a bi-product of the polishing operation. This arrangement offers many improvements over the prior art. By way of example, and with reference still to FIG. 2, according to known methods, the external edges of the valve hole 40 must be manually deburred. As with all other deburring procedures done by hand, the results are inconsistent. (For example, when the surface of the wheel 20 is deburred by conventional manual methods, the resulting surface is often uneven. This procedure is also very time-intensive.) According to the present invention, deburring of the edges of the valve hole 40 (along with the other edges) takes place during the polishing process, so is a desirable by-product of the polishing process. The present process thus provides for a consistent radius over all of the deburred edges which is a significant improvement over known manual deburring methods.

Still with reference to FIG. 3, during the process of the present invention the edges 32 and 34 are deburred while the polishing process is undertaken. Accordingly, smooth and even edges are formed along the surface of the entire wheel 20.

FIG. 4 illustrates the wheel 20 after undergoing the process of the present invention. It will be noted that the edges 32, 34 and 36 are now smooth and uniformly rounded.

Other control factors that determine the amount of material to be removed from the wheel 20 include adjusting the level of the DC current, adjusting the voltage, adjusting the concentration and flow rate of the electrolyte solution, and adjusting the dwell time (the exposure time) of the part to be finished to the electrolyte solution.

Figure 5:
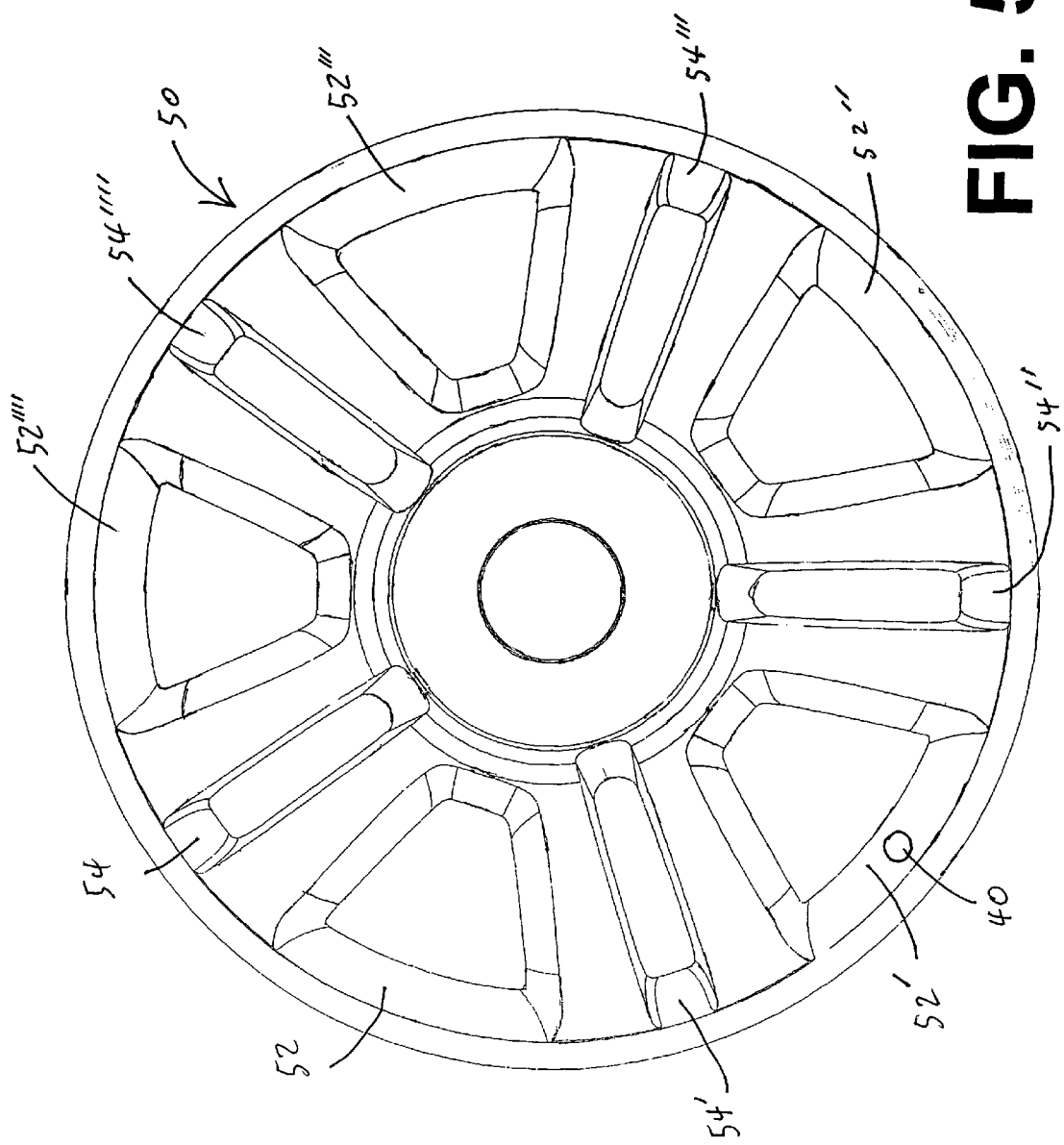
FIG. 5 shows a top plan view of a full wheel disc-covering electrode.

FIG. 5 illustrates a plan view of a full-covering electrode, generally illustrated as 40. The electrode 50 includes a plurality of outwardly-extending, window-fitting extensions 52, 52', 52", 52'", 52"" and a like plurality of outwardly-extending, pocket-fitting extensions 54, 54', 54", 54'", 54"". A surface 56 of the electrode 50 is formed between the window-fitting extensions 52...52"" and the pocket-fitting extensions 54...54"". The surface 56 is generally opposed to the A face of the vehicle wheel to be finished. Of course, the electrode 40 may be configured so as to embody a different configuration of window-fitting extensions and pocket-fitting extensions as required to match a particular vehicle wheel.

Each of the window-fitting extensions 52...52"" and the pocket-fitting extensions 54...54"" includes side faces which oppose the B faces of the wheel when the electrode 40 is positioned over a wheel (not shown). A gap is defined between the faces of the electrode 40 and the wheel. This arrangement allows for electrolyte to flow through the gap. The flow rate of the electrolyte may be controlled and the gap may be adjusted as desired to determine the amount of material to be removed from the wheel as described above. In addition, other variables related to the electrolyte itself may be adjusted (concentration and dwell time) as needed.

The present invention has a broad application to a great variety of wheel configurations regardless of the embodiment used. The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An apparatus for electrochemical material removal and polishing of a vehicle wheel, the vehicle wheel having an outer surface and at least a pair of intersecting surface faces thereon and an edge at the intersection of the surface faces, the apparatus comprising:

an electrode for placement substantially over the outer surface of the vehicle wheel, the electrode including at least one protruding portion, the protruding portion being placeable adjacent at least one of the pair of intersecting walls and the defined edge, the protruding portion being spaceable apart from said at least one of the pair of intersecting walls and the defined edge at a gap which defines a pre-determined distance;

and an electrolyte solution that is substantially flowable between said gap;

the wheel has plural recessed areas in the form of windows, pockets or both formed thereon and said electrode has a like number of protrusions for placement substantially within the respective recessed areas, and the protrusions being formed corresponding to the shape of the recessed areas;

the electrode further having a lip extending over the edge of the vehicle wheel to deburr and finish the edge.

2. The apparatus of claim 1 wherein said electrode is composed of a conductive material.

3. The apparatus of claim 1 wherein said electrolyte is selected from the group consisting of sodium chloride, sodium nitride, sodium nitrate and sodium sulfate.

4. The apparatus of claim 1 wherein said gap is preferably in the range of between 0.01" and 0.15".

5. The apparatus of claim 1 further including a rectifier connected to the wheel and to said electrode.

6. A method for the electrochemical removal of material and the polishing of a vehicle wheel, the vehicle wheel having an outer surface at least one window formed in the outer surface, the method comprising the steps of: forming an apparatus, the apparatus comprising an electrode having a body, said body having wheel-facing surface, said wheel-facing surface having a window-positioning protrusion extending therefrom; placing said window-facing surface of said electrode adjacent the outer surface of the wheel such that said window-positioning protrusion is substantially placed within the window formed on the wheel defining a gap between the protrusion and the window, and the electrode has a lip extending over the edge of the vehicle wheel to deburr and finish the edge; connecting leads from a rectifier to the wheel and to said electrode; flowing an amount of electrolyte between said gap; energizing said rectifier; and continuing with the flow of electrolyte until the outer surface and window of the wheel are free from burrs and are polished.

7. The method of claim 6 wherein the at least one window of the wheel includes both open and blind windows and wherein said protrusions of said electrode are substantially positionable within the windows.

8. The method of claim 6 wherein said electrolyte is selected from the group consisting of sodium chloride, sodium nitride, sodium nitrate and sodium sulfate.

9. The method of claim 6 wherein said gap is preferably in the range of between 0.01" and 0.15".

10. The method of claim 6 wherein said electrode is composed of a conductive material.

\* \* \* \* \*